United States Patent [19]

Delgleize et al.

[11] 4,286,765
[45] Sep. 1, 1981

[54] VEHICLE SEATS

[75] Inventors: Jean Delgleize, Brussels; Henri Deleenher, Soignies, both of Belgium

[73] Assignee: UOP Inc., Des Plaines, Ill.

[21] Appl. No.: 37,184

[22] Filed: May 8, 1979

[30] Foreign Application Priority Data

May 10, 1978 [GB] United Kingdom ............ 18630/78

[51] Int. Cl.³ .............................................. A47C 3/22
[52] U.S. Cl. .................... 248/573; 248/161; 297/345
[58] Field of Search ............ 297/345; 248/161, 162.1, 248/573, 157

[56] References Cited

U.S. PATENT DOCUMENTS

| | | | |
|---|---|---|---|
| 2,483,395 | 10/1949 | Benson | 248/161 |
| 3,493,211 | 2/1970 | Barecki et al. | 248/573 |
| 3,519,240 | 7/1970 | Swenson | 248/573 |
| 3,927,854 | 12/1975 | Carey | 248/573 X |
| 3,954,298 | 5/1976 | Lowe | 297/345 X |
| 3,957,304 | 5/1976 | Koutsky | 248/573 X |
| 4,069,992 | 1/1978 | Lada | 248/573 |
| 4,092,009 | 5/1978 | Koutsky | 297/345 X |

FOREIGN PATENT DOCUMENTS

| | | | |
|---|---|---|---|
| 957264 | 11/1974 | Canada | 297/345 |
| 957322 | 5/1964 | United Kingdom . | |
| 1070381 | 1/1967 | United Kingdom . | |
| 1172569 | 12/1969 | United Kingdom . | |
| 1414157 | 11/1975 | United Kingdom . | |

*Primary Examiner*—James T. McCall
*Attorney, Agent, or Firm*—James R. Hoatson, Jr.; Barry L. Clark; William H. Page, II

[57] ABSTRACT

The invention relates to a vehicle seat, of the type in which a seat part is spring-mounted on a base part and in which the height of the seat part above the base part can be varied by varying the preload of the spring. The movement of the seat part is limited by UP-stop and DOWN-stop assemblies and the invention provides means for automatically moving the UP-stop position in dependence upon a change to the static height of the seat.

6 Claims, 4 Drawing Figures

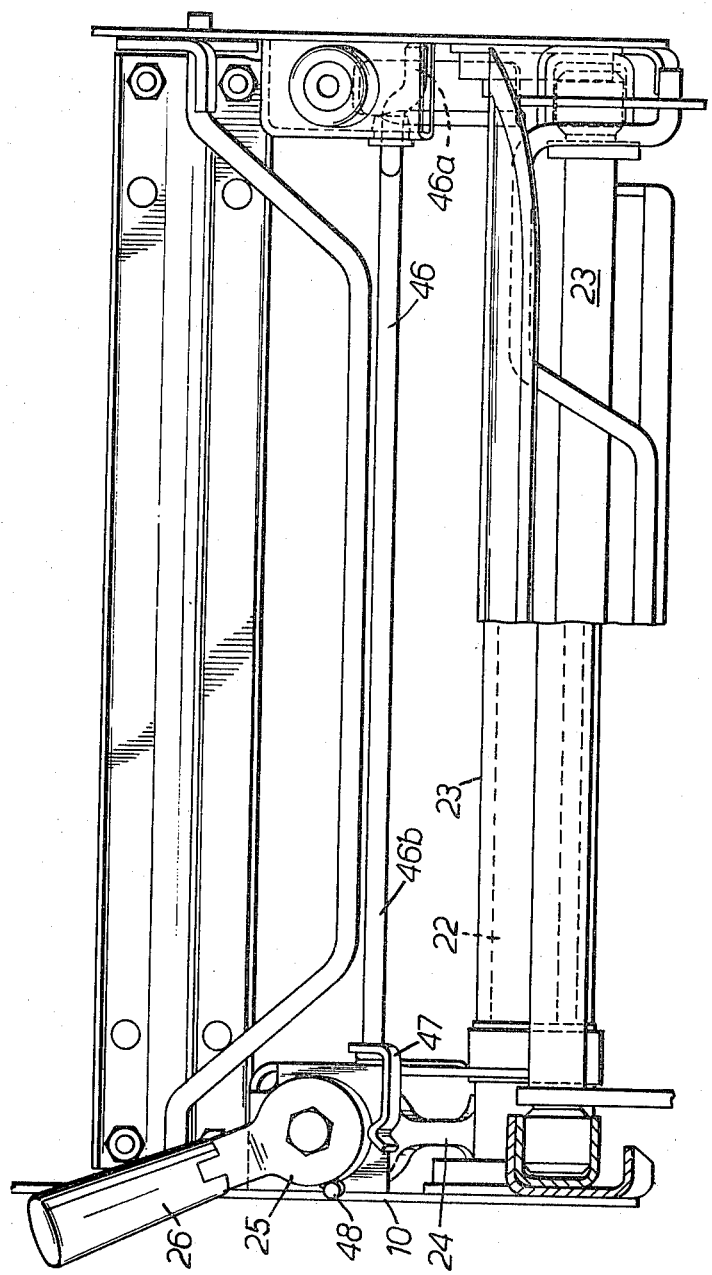

VEHICLE SEATS

BACKGROUND OF THE INVENTION

This invention relates to vehicle seats.

It is known for example from British Pat. No. 1,070,381 to provide a vehicle seat comprising a seat part, a base part, a suspension interconnecting the seat part and the base part and forming a guide for the upward-downward movement of the seat part relative to the base part, a seat-support spring which acts upwardly on the seat part and which, under static load conditions, supports the seat part and the seat occupant at a ride position which is adjustable by varying the preload of the spring. In this seat, an Up-stop assembly was formed by an Up-stop device and an Up-stop abutment mounted respectively on parts of the seat which moved relatively to each other during rise and fall of the seat part, and said Up-stop device was movable relative to the part of the seat on which it was supported to vary the Up-stop position viz. the height of the seat part at which further upward movement of the seat part is prevented by mutual engagement of the Up-stop device and Up-stop abutment.

In such a seat however, the Up-stop device was movable at the will of the seat occupant and the correct adjustment of the Up-stop device depended on the seat occupant repeatedly moving his body weight on to and away from the seat and repeatedly adjusting the device until a desired Up-stop position relative to the ride position was achieved. A similar vehicle seat is described in British Pat. No. 1,414,157 but this suffers from the same drawbacks as that described above.

An object of the invention is to provide a seat of the type under consideration, in which an Up-stop device is easily adjustable, and in particular is adjustable automatically in response to the seat occupant raising or lowering the ride position of the seat part.

BRIEF SUMMARY OF THE INVENTION

The object of the invention is achieved by the Up-stop device being compressible, against the force of a first return spring, through a distance corresponding to the distance between the ride position of the seat and the Up-stop position and by the provision of a normally engaged, but releasable, locking device for locking the Up-stop device to its support member, and a second return spring which acts on the Up-stop device and, upon release of the locking device, urges the Up-stop device against the abutment device with a force substantially weaker than the force of the first return spring.

BRIEF SUMMARY OF THE DRAWINGS

One embodiment of a vehicle seat in accordance with the present invention will now be described by way of example only with reference to the accompanying drawings in which:

FIG. 4 is a section through part of the vehicle seat in a horizontal plane showing the means for actuating the Up-stop device.

DESCRIPTION OF PREFERRED EMBODIMENT

Figure 1:
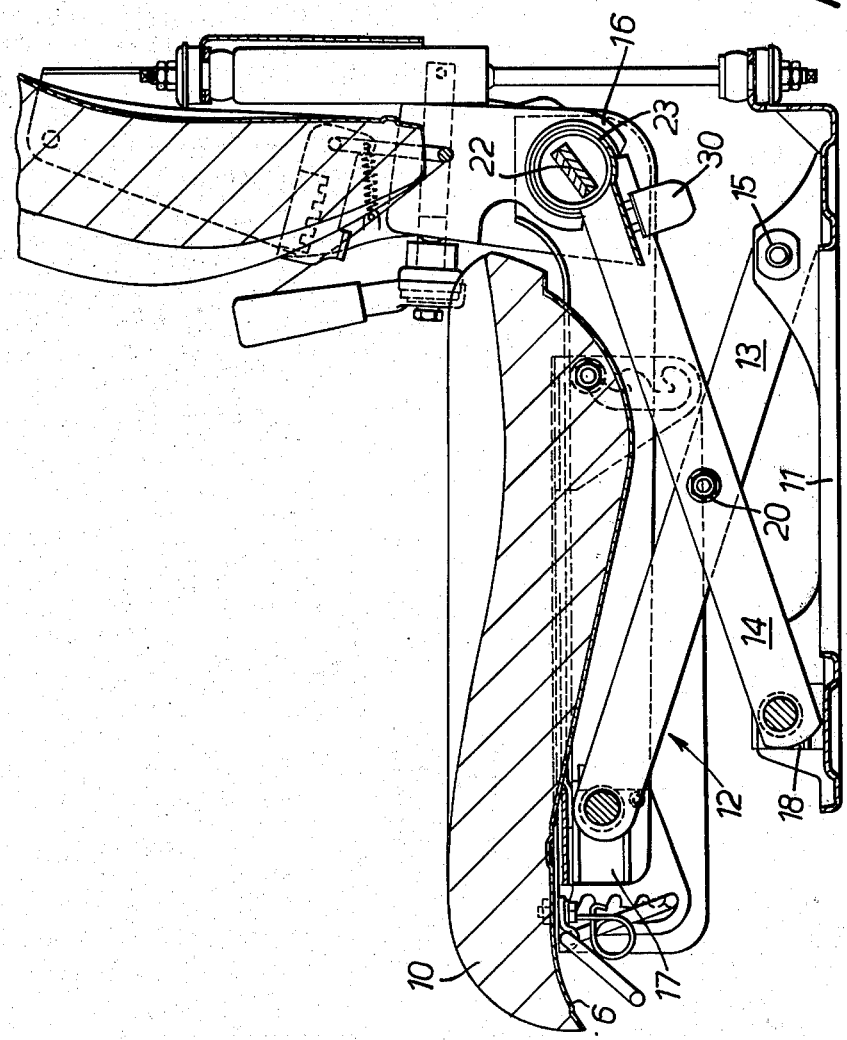
FIG. 1 is a side elevation of a vehicle seat.

As shown in the drawings the vehicle seat comprises a seat part 10 mounted on a base part 11 by means of a suspension 12 which comprises a pair of crossed arm linkages 13, 14 on each side of the seat, each pair being located in a vertical plane. The rearward ends of the linkages are pivoted respectively to the base part and seat part by fixed pivot connections 15, 16, and the forward ends of the linkages are connected respectively to the seat part and base part by sliding or roller pivot connections 17, 18. The linkages 13, 14 are also pivotally connected at their intersection 20. Accordingly the seat part 10 is guided by the linkages for movement vertically upwards and downwards relative to the base part 11.

The seat part is biased upwardly by a load-carrying spring in the form of a torsion bar 22 mounted within a torsion tube 23 which extends across the back of the seat and forms an envelope for the torsion bar. One end of the torsion bar is secured to a corresponding end of the torsion tube whereas the opposite ends of the torsion bar and torsion tube are connected respectively to the seat part and to the upper rearward ends of linkages 14, each pivot connection 16 forming a bearing for the torsion tube.

In order to vary the preload in the torsion bar, the torsion bar 22 is connected by a radial arm 24 (FIG. 4) to the seat part 10 through an adjusting screw mechanism 25 journalled on the seat part 10 and including a ratchet handle 26. By rotating the ratchet handle in one direction or the other, the adjusting screw mechanism will increase or decrease the preload in the torsion bar, and thereby raise or lower the seat. The details of a suitable mechanism are fully described in the British Pat. Nos. 957332 and 1172569 and form no part of the present invention. It is sufficient however to indicate that the ratchet of the ratchet handle can be set to drive the screw mechanism in either direction so that if rotation of the handle in one direction drives the screw, rotation in the opposite direction is permitted by the ratchet without movement of the screw.

The DOWN stop device for the seat can be a rubber bumper 30 mounted on the seat part or on linkage 14 as shown in FIG. 1.

Figure 2:
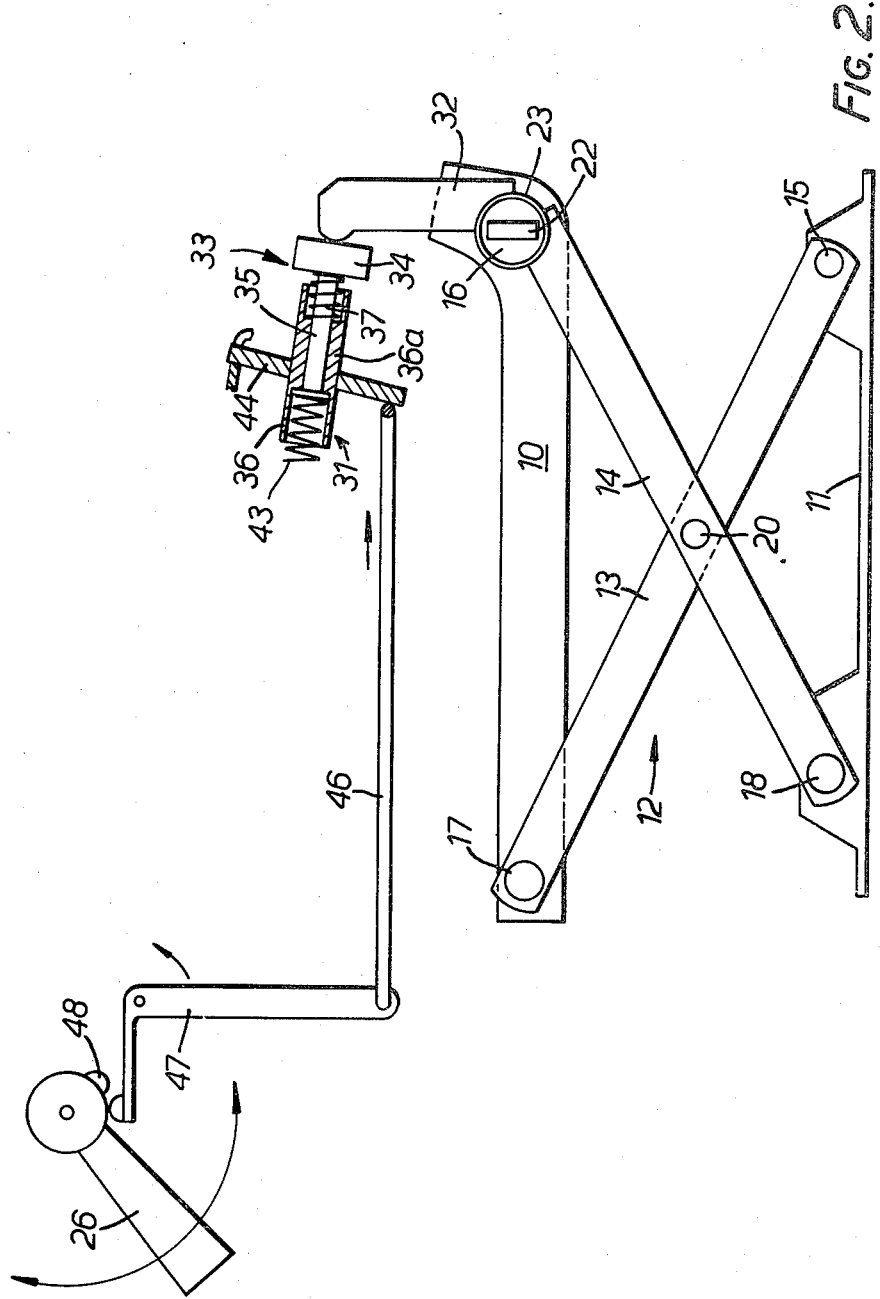
FIG. 2 is a diagrammatic representation of an Up-stop device together with means for locating the Up-stop device in dependence on the ride position of the seat.
Figure 3:
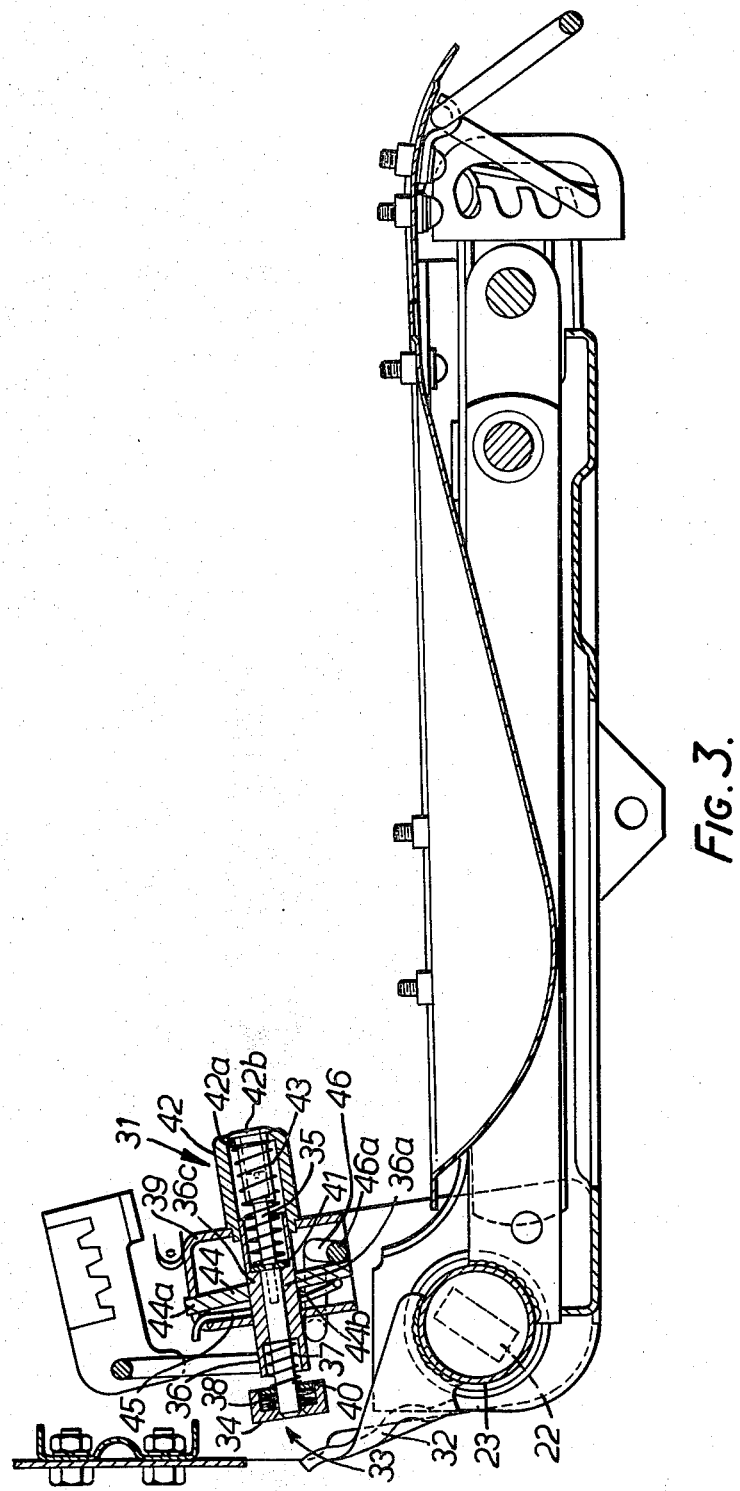
FIG. 3 is a section through the seat in a fully collapsed state showing details of the Up-stop device.

An UP stop device 31 which is illustrated diagrammatically in FIG. 2 and in detail in FIG. 3 is mounted on the seat part 10 and coacts with an abutment member in the form of a lever 32 extending radially from the torsion tube 23. The UP stop device 31 comprises a buffer device 33 formed by a buffer member 34 mounted on a piston rod 35 which is slidable within a carrier member 36, the buffer member being biassed outwardly by a compression spring 37.

As shown in FIG. 3, the internal diameter of the carrier member 36 over a central portion 36a is such as to receive the piston rod in a sliding fit, the outer end of the carrier member 36 adjacent the buffer member 34 having a larger internal diameter to provide a housing for the compression spring 37. A supplementary compression spring 38 can be provided, as shown in FIG. 3, on the piston rod between the rear face of the buffer member 34 and a disc 40 slidably mounted on the piston rod between the adjacent ends of the two springs 37, 38. The movement of the buffer member 34 away from the carrier member 36 is limited by a stop disc 41 secured to the piston rod and movable within a recessed portion of the carrier member 36 at its end remote from the buffer member 34.

The buffer device 33 is mounted on the seat part within a support member 39 (FIG. 3) formed by a U section stamping having apertures on opposite sides thereof within which the buffer device is slidable. A tube 42 is fixed at one end within one of the apertures of the support member and forms a housing for receiving and guiding the adjacent end of the piston rod 35 and a second compression spring 43 which surrounds the adjacent end of the piston rod and acts between a shoulder 42a in the tube 42 and the stop disc 41. A sleeve 42b mounted within the tube 42 forms a sliding guide for the end of piston rod 35.

Means for locating the buffer device within the support member comprise a locking device in the form of a locking plate 44 having one edge portion 44a thereof pivotally received in a slot in the base of the U section support member 39, the plate having a central aperture 44b through which the carrier member 36 passes in a close sliding fit. A detent leaf spring 45, which is received at one end in an aperture of the U section support member, acts on the plate 44 to urge it pivotally in the same direction as that in which the carrier member 36 is urged by the abutment member 32. When the plate 44 is moved by the spring 45 away from a position in which it is perpendicular to the axis of the carrier member 36, the carrier member binds within the aperture 44b and is locked thereby against further movement under the force of the abutment member 32. If however the plate 44 is urged against the force of the detent spring 45 into a position in which it is again perpendicular to the axis of the carrier member 36, the locking device is unlocked and the carrier member 36 is released for movement in either direction along its axis.

The means for locking and unlocking the locking device is the cranked end 46a of a coupling rod 46 whose opposite end 46b (FIG. 4) is connected to a bell crank 47 which is movable by an actuating device 48 mounted on the ratchet handle 26. Consequently rotation of the ratchet handle 26, in particular on its return movement, is operative to tilt the bell crank lever 47 and hence rotate the rod 46 so that the cranked end 46a of the rod acts on the locking plate 44 to move it into its unlocked position.

The operation of the seat is as follows.

When the seat is unoccupied, the preload in the torsion spring will urge the seat part upwardly into its UP stop position. However, when a person sits on the seat, the weight of the seat occupant will depress the seat part away from the UP stop position to a ride position, i.e. the static load position of the seat, in which the weight of the seat part and its occupant is balanced by the torque of the torsion bar. If this ride position is too high or too low for the seat occupant, he can raise or lower the ride position by rotating the ratchet handle in the appropriate sense thereby increasing or decreasing the preload of the torsion bar. The effect of operating the ratchet handle will also be to pivot the bell crank lever 47 and hence the cranked end 46a of the coupling rod 46 to move the locking plate 44 into its unlocked position. This will allow the spring 43 acting on the buffer device 33 to urge the carrier member 36 in a forward direction until the buffer member 34 engages the abutment member 32 which extends radially outwardly from the torsion tube 23. Thus, at each rotational movement of the ratchet handle, the locking plate is released thereby to release carrier member 36 to take up a new position under the opposing forces of the abutment member 32 and the compression spring 43.

The spring 43 will be a much weaker spring than the springs 37 and 38 and therefore there will be very little compression of springs 37, 38 when the carrier member 36 is urged by spring 43 against abutment member 32. Immediately after the locking device has been tripped to its unlocked position, the detent leaf spring 45 will urge it back into its locked position thereby locking the carrier member 36 to the support member 39 in the position determined by the abutment member 32 and spring 43.

If now the occupant leaves the seat, the torsion bar 22, being a much stronger spring than springs 37, 38 will urge the seat upwardly causing the abutment member 32 to press against the buffer member 34 and force it inwardly towards the carrier member 36 against the force of springs 37 and 38. When this happens, the disc 40 will first engage the adjacent end of carrier member 36 and then spring 38 will be compressed until buffer member 34 can move no further towards the carrier member 36. The buffer member 34, and hence the seat part 10, are now in the UP stop position since no further movement of the seat part in the upward direction is possible while the locking device remains locked.

We claim:
1. A vehicle seat comprising
   a seat part,
   a base part,
   a suspension interconnecting the seat part and the base part and forming a guide for the upward and downward movement of the seat part relative to the base part,
   a seat-supporting spring which acts upwardly on the seat part and, under static load conditions supports the seat part and the seat occupant at a ride position which is adjustable by varying the preload of the spring, the seat having elements which move relatively to one another during rise and fall of the seat part relative to the base part,
   an up-stop device and an up-stop abutment mounted respectively on said relatively movable elements of the seat,
   a support member fixed to one said element and on which the up-stop device is movably mounted, said up-stop device being movable relative to the support member to vary the up-stop position, namely, the height of the seat part at which further upward movement of the seat part is prevented by mutual engagement of the up-stop device and up-stop abutment, characterised by the improvement that the up-stop device is compressible, against the force of a first return spring, through a distance corresponding to the distance between the ride position of the seat and the up-stop position, and the seat includes,
   a normally engaged, but releasable, locking device for locking the up-stop device to said support member, and,
   a second return spring which acts on the up-stop device and, upon release of the locking device, urges the up-stop device against the abutment device with a force substantially weaker than the force of the first return spring.

2. A vehicle seat according to claim 1 wherein the up-stop device comprises a carrier member, and a buffer member mounted for sliding movement on the carrier member against the force of said first return spring, the maximum extent of said movement determining the distance between the ride position and the up-stop position of the seat.

3. A vehicle seat according to claim 1 having means, operable in response to variation of the preload in the seat-support spring, for releasing the locking device.

4. A vehicle seat according to claim 1, wherein the locking device includes a detent spring which automatically relocks the locking device after an unlocking force has been removed.

5. A vehicle seat according to claim 2 wherein the locking device comprises a plate having an aperture therein within which the carrier member is slidable in a close fit, one side of said plate being hinged to the support member and a locking spring biassing said plate into a position in which it is inclined to the axis of movement of the carrier member and thereby locks the carrier member against movement in one direction, said coupling device being operable to tilt the plate in opposition to said locking spring to release the carrier member from locking engagement with the plate.

6. A vehicle seat comprising a seat part, a base part, a suspension mounting the seat part for upward and downward movement relative to a base part, a spring biassing the seat part in an upward direction toward an up stop position, an up stop device and an abutment device mounted respectively on elements of the seat which move relatively to each other as the seat part moves relatively to the base part, a normally operative locking device locking the up stop device in position, the up stop device being compressible against the force of a first return spring through a distance corresponding to the distance between the ride position of the seat and the up stop position, and, a second return spring operable, while the up stop device is released from the locking device, to urge the up stop device against the abutment device with a force substantially weaker than the force of the first return spring to reposition the up stop device in response to each release of the locking device.

* * * * *